Patented Nov. 30, 1937

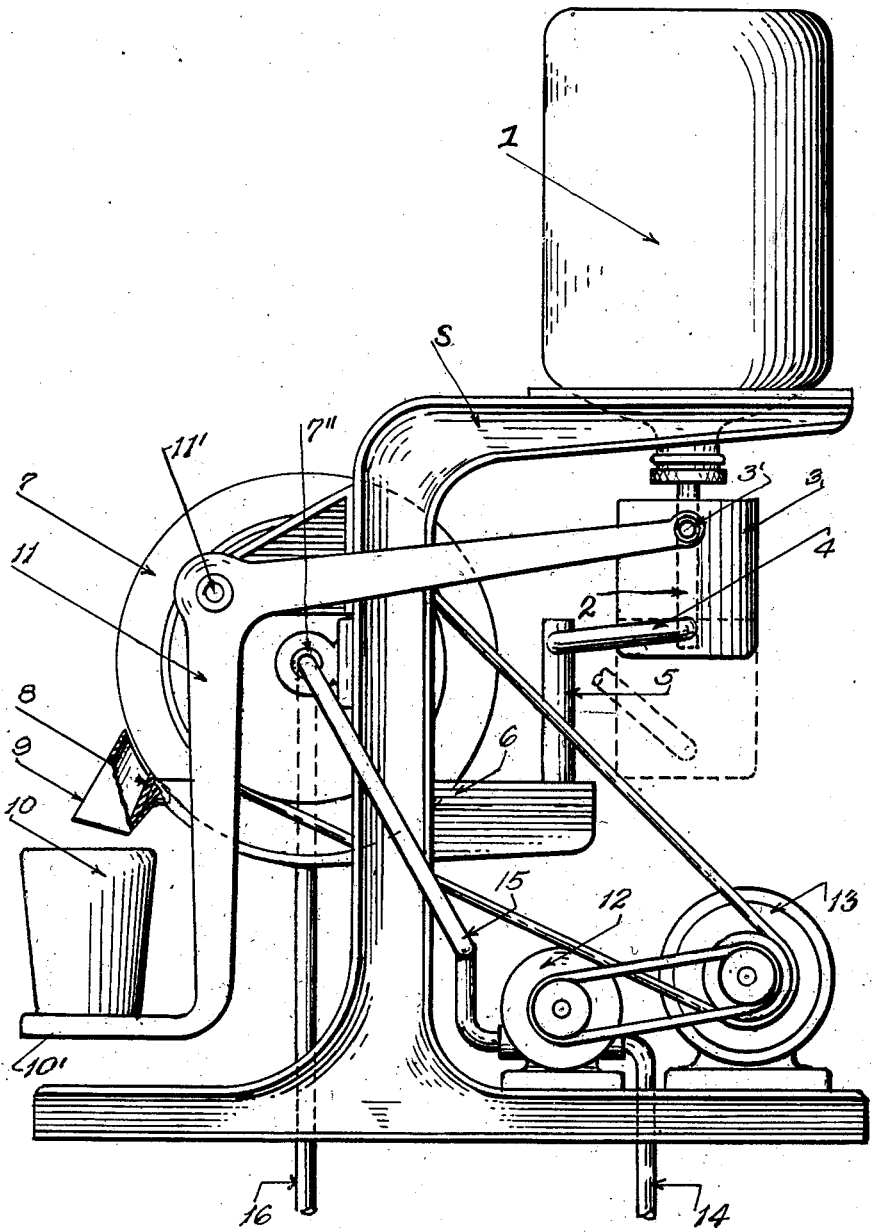

2,100,742

UNITED STATES PATENT OFFICE 2,100,742

PROCESS AND APPARATUS FOR BEVERAGE DISPENSING

Thomas L. Hartman, Pittsburgh, Pa., assignor, by direct and mesne assignments, of one-third to E. J. W. Keagy, one-third to Harold M. Young, both of Pittsburgh, Pa., and one-third to Reymer & Brothers, Inc., Pittsburgh, Pa., a corporation of Pennsylvania Application September 1, 1934, Serial No. 742,507

6 Claims. (Cl. 225—21)

My present invention relates to a process of and apparatus for preparing and dispensing successive portions of a beverage in soft, frozen or slushy condition.

Heretofore chilled beverages have been dispensed in a variety of ways which, for the most part, depend upon purely manual operations. Where a beverage consisting of a liquid portion and a frozen portion has been served, the usual manner of serving such is merely to place chipped or crushed ice in the liquid portion and to serve the drink in such manner. There are other variations in serving such a beverage but in general they all involve the addition of ice in some form to a liquid to make the beverage. In some cases, however, the liquid beverage is merely chilled by being placed in heat exchange relationship with ice or some other refrigerant and served in such form.

Such prior practices have recognized objections both from the standpoint of the vendor and from the standpoint of the purchaser. Such practices usually require either the maintenance of a relatively large body of chilled beverage or the provision of a material supply of ice or other refrigerant. Beverages served in this manner are not only lacking in strength and uniformity but they are unsatisfactory to the purchaser in that frequently the taste or flavor of the beverage is adversely affected or it becomes necessary for the purchaser to masticate a considerable quantity of hard ice, which is practically tasteless, since the ice does not retain any appreciable quantity of beverage thereon. Where a large body of beverage is required to be maintained in chilled condition, this is a time consuming and expensive operation. These practices of dispensing beverages have a further common disadvantage in that the vendor is not prepared at all times to dispense a fully prepared palatable drink.

It is accordingly one of the objects of my present invention to obviate the above and other recognized disadvantages of present practice in dispensing beverages and to provide for the preparation and dispensing of individual portions of beverage in freshly prepared and uniformly pleasant condition.

Another object resides in a procedure wherein it is unnecessary to maintain a relatively large body of prepared beverage but wherein the main body of the beverage is in an unprepared condition but from which individual successive servings can be produced without resorting to manual operations.

A further object resides in the provision of an apparatus by means of which individual servings of average composition may be segregated from a main body of unprepared beverage and each such serving subjected to a rapid freezing of such a nature as to convert the serving into a mixture of liquid and soft frozen flakes, such mixture thereafter being transferred to a receptacle substantially as it is prepared.

Other and further objects and advantages will be apparent from the following description or will be understood by those skilled in this art.

The apparatus and process of this invention produce a distinctly different product from other processes. Specifically they are different in the strength of the flavoring of the frozen particles and in the texture of the frozen particles in the mixture or liquid.

Further objects of this invention are to produce a uniform proportion of frozen particles in the mixture or liquid for each individual serving, to avoid the necessity of capital investment for refrigerating means and to attain greater expansion of the liquid which forms the frozen particles, thereby requiring less liquid to the drink of said beverage, less labor, with insurance of greater speed in dispensing and greater profits.

The instantaneous or fast freezing of the liquid in this invention produces frozen flakes which are very smooth, loose and fluffy, and the rapid speed of the freezing action does not permit a separation of syrup or extract from the water in the mixture, therefore, the flavor of the frozen particles is as strong as the original liquid mixture and not pure ice coated with the syrup or extract like the other processes. The fast freezing of this invention expands the frozen flakes to the greater volume, as much as ten times greater than the liquid volume, while with the other processes, the specific gravity of the ice is about .91 compared to 1.0 for the liquid water. These figures show that the frozen particles produced by the other processes are dense, hard and solid, not permeated by the flavoring or the like, whereas the frozen particles with this invention are light, loose, fluffy, soft and smooth. These characteristics are attractive qualities for consumption purposes and produce a pleasant sensation on the consumer's tongue and throat when the beverage is being swallowed. Also these qualities which are produced in the rapid freezing and expansion give a larger bulk from a small quantity of liquid, as mentioned above, and this gives a greater number of drinks served per gallon of original solution, which of course means a greater return in money.

With this invention, it is possible to condition each individual serving of the beverage so that all proportions of the frozen flakes and the liquid are uniform.

In cases where the selection is made to use a mechanical ice cream cabinet as a source of refrigeration with this invention, it is only necessary to remove the cork or stopper over the brine compartment of the ice cream cabinet and introduce into said hole a small suction line for the brine pump and a discharge line from the refrigerated surface of the dispensing apparatus. In this way use can be made of the ice-cream cabinet without interfering with the use of such cabinet for its normal intended purposes.

With the use of this invention, greater speed is attained in dispensing the beverage and therefore less labor is required. This is mainly due to the speed at which freezing takes place, and the design of the apparatus, the latter being arranged so that the placing of a receptacle on the end of a lever, moves a measuring cup so that the proper amount of liquid comes into contact with the refrigerated surface, and the mixture leaving such refrigerated surface is discharged into the empty receptacle.

The accompanying drawing illustrates without limitation, and by way of example only, one of the preferred forms of apparatus which can be used to carry out the process of this invention, the view being a side elevation of the major parts, the display covering being removed.

In the drawing, the reference numeral 1 indicates the reservoir for the supply of liquid beverage, removably and in any suitable way mounted on a frame or supporting structure S. Numeral 2 designates a vacuum sealing tube which extends from the bottom of the reservoir and terminates slightly below the top of a measuring cup 3 when same is in its lowest position as shown by the dotted or broken lines on the drawing. The measuring device 3 is shown in solid lines in the position it assumes while a drink is being processed or while the liquid is flowing from the cup 3 through a flexible tube 4 and a stationary tube 5 which discharges the liquid into a pan 6, in which rotates a refrigerated cylinder or wheel 7 on a horizontal axis 7'. When a drink is being processed, the liquid mixture in pan 6 is picked up on the outer surface of the rotating cylinder 7 as a thin film of liquid which is taken from the pan 6 due to the counter-clockwise rotation of said cylinder, while the liquid is adhering to the outer surface of the wheel it gives up a portion of its heat content, due to the heat transfer through the thin metal surface of the cylinder to the refrigerating medium which is on the inside of the wheel surface. Such surface, for example only, is maintained at a temperature say between 5° F. and 10° F. By properly proportioning the cylinder surface, thickness of liquid film and temperature of the refrigerating medium it is possible to freeze the right amount of flakes in the beverage while the same adheres to the surface of the refrigerated cylinder during the travel of about three fourths of a revolution (270°) of the cylinder 7.

A scraper 8 on the pan 6, usually extending throughout the length of the cylinder and being flexible, and composed for instance, of metal or "Bakelite", is used to remove the conditioned beverage from the surface of the refrigerated cylinder, while a funnel or chute 9, also on pan 6, guides the beverage from the scraper into the consumer's receptacle, e. g., a tumbler or glass 10. If desired, elements 8 and 9 may be made in one piece to serve as both a scraper and chute.

A lever 11, as shown on the drawing, is fulcrumed at 11' on supporting structure S which is shown in the position assumed by it while a drink is being dispensed. A shelf 10' on the lower end of such lever 11 supports a tumbler 10 while the aforesaid cup 3 is suspended from or pivotally connected at 3' to the forward end of lever 11.

A rotating prime mover 13 operates a brine pump 12 and the refrigerated cylinder 7. Said means 13 may be an electric motor as shown, a hand crank or other suitable arrangement. Said pump 12 is provided with a brine suction tube 14 which starts at the inside of a brine tank of an existing mechanically refrigerated ice cream cabinet or soda fountain (not shown) and which terminates at the suction inlet of the brine pump, while a brine supply tube 15 conveys the refrigerated brine from the discharge outlet of the brine pump to the inlet of the rotating cylinder 7. A brine return tube 16 conveys the brine from the outlet connection of the freezing cylinder 7 and discharges the brine back into the brine tank, where the brine is again cooled by the existing refrigerating means and rendered available for further cooling work in the existing ice cream cabinet or the new beverage dispensing apparatus in accordance with this invention.

It is understood that whenever a dispensing apparatus covered by this invention is installed at a location where no refrigerated brine tank exists, that a complete mechanical refrigerating machine can be substituted for the brine pump 12 and the brine tubes 14, 15 and 16 within the spirit and scope of this invention.

Although the invention is not limited to practice with any particular beverage or beverages, for example only, I will say that it initially may be a mixture basically of lemon or other fruit juice or flavoring, with sugar or syrup, and water.

In accordance with the invention, a drinking glass or tumbler is manually placed on the shelf 10' of lever 11 and the operator with his hand still on the glass pushes the operating lever in a counter-clockwise direction on its supporting pivot 11'. This movement of the operating lever 11 raises the measuring cup 3 from the dotted line to the solid line position shown on the drawing. The elevating of cup 3 allows the liquid originally held therein to flow from said cup through the flexible tube 4, down the standpipe 5, and into pan 6. While the cup 3 is elevated, the tube 2 is sealed at or near the bottom of cup 3 so that no liquid can flow from the storage reservoir 1. With the refrigerated cylinder 7 rotating in pan 6 the beverage is picked up from the pan and held on the surface of the cylinder. A portion of the liquid is frozen during the time the cylinder turns about 270°. The scraper 8 removes the conditioned beverage from the surface of the refrigerated cylinder and the chute 9 directs the beverage into the consumer's glass 10. When the glass is filled, the operator moves both the glass and operating lever simultaneously in a clockwise direction and then lifts the glass from the shelf 10' and delivers same to the consumer.

After the glass is removed from the shelf 10' the operating lever swings downwardly at the reservoir end so that the measuring cup 3 assumes its lower or broken line position. This lowering of cup 3 causes the breaking of the vacuum seal of tube 2, permitting air to rise through tube 2 and allowing a quantity of liquid to flow from the reservoir 1 into cup 3, the alternating of gobs of air and liquid mixing or agitating the liquid in the reservoir, so that the supply of liquid is in a uniform mixed condition and does not allow a settling of the heavy syrup to the bottom of the reservoir. When the liquid approaches the top of cup 3, the tube 2 becomes sealed so that no more liquid can descend from the reservoir while the apparatus remains idle.

Various changes may be resorted to within the spirit and scope of the invention.

I claim:—

1. In an apparatus of the class described, a reservoir to contain a liquid mixture, said reservoir having a discharge tube, a measuring cup to receive the mixture from said discharge tube, a lever carrying said cup and permitting the cup to assume its lowermost position when containing the mixture, said tube having its outlet adjacent the top of the cup in the lower position of the latter, refrigerating means for the measured liquid, means operable to supply the measured liquid to the refrigerating means in the raised position of the cup, means operable to remove the conditioned liquid from the refrigerating means, in combination with a receptacle positioned on the lever to maintain the cup raised and into which the conditioned liquid is discharged.

2. An apparatus for preparing a beverage of the type described, comprising means for storing a quantity of unprocessed liquid beverage, means for delivering a portion thereof to a freezing device, a freezing device adapted to convert a part of such portion into soft, flat, semi-solid flakes while only chilling the remainder of the said portion, and means to discharge the chilled liquid and semi-solid flakes into a receptacle, said second means including a measuring cup which is movable into an upper and a lower position, and a lever for actuating said cup into such positions.

3. An apparatus for preparing a beverage of the type described, comprising a supporting structure, a reservoir mounted thereon, a freezing unit supported thereby, and a lever pivoted to said supporting structure, means actuatable by said lever to convey measured portions of beverage from the reservoir to the freezing unit, and means for discharging beverage from the freezing unit to a receptacle.

4. An apparatus for preparing a slushy beverage comprising means for maintaining a supply of unprepared liquid beverage, means for measuring out an individual portion of such beverage, means for rapidly converting such portion to a mixture of chilled liquid and soft frozen flakes, a device for removing such mixture from the last mentioned means and means for holding a receptacle in position to receive such mixture and for operating said measuring means.

5. The process of preparing a serving from a main body of beverage material in bulk capable of being frozen into soft flakes; said process comprising simultaneously agitating said bulk material to render the same uniform and segregating a predetermined quantity from the main body; forming a mixture of soft frozen flakes and liquid therefrom by subjecting successive portions of the quantity to a sharp freezing temperature and transferring to a receptacle liquid and flakes substantially as the latter are formed.

6. The process of preparing a serving from a main body of beverage material in bulk capable of being frozen into soft flakes which comprises segregating a serving of predetermined quantity from the main body while agitating such main body to ensure that the serving is of average composition, subjecting the serving in successive increments to a quick freezing to convert the same into a mixture of chilled liquid and soft frozen flakes and transferring such liquid and flakes substantially as the latter are formed to a suitable receptacle.

THOMAS L. HARTMAN.